Sept. 1, 1942.    G. S. HENDRIE    2,294,555
METHOD AND APPARATUS FOR FORMING THERMOPLASTIC STRIPS
Filed Jan. 5, 1940    3 Sheets-Sheet 1
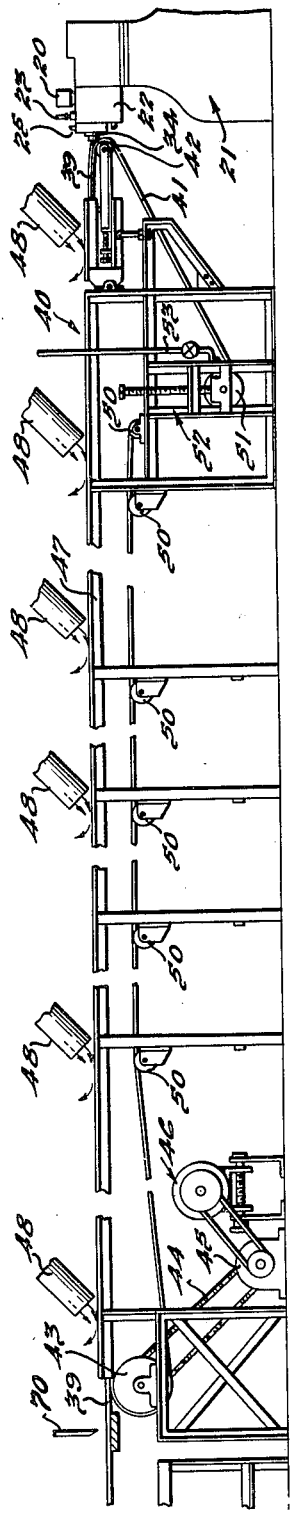
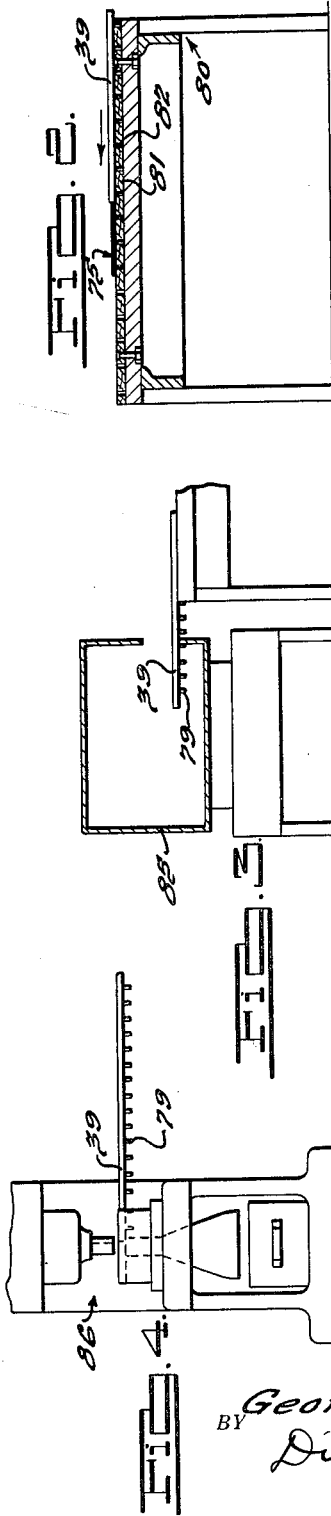
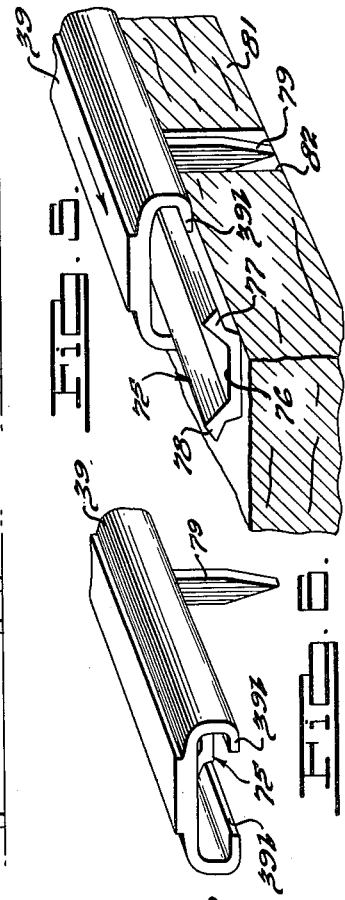
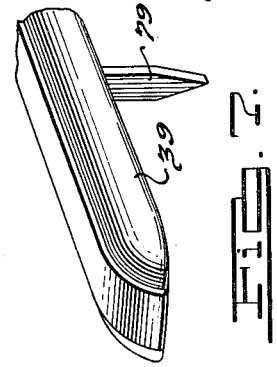
INVENTOR
George S. Hendrie.
BY Dike, Calver & Gray
ATTORNEYS

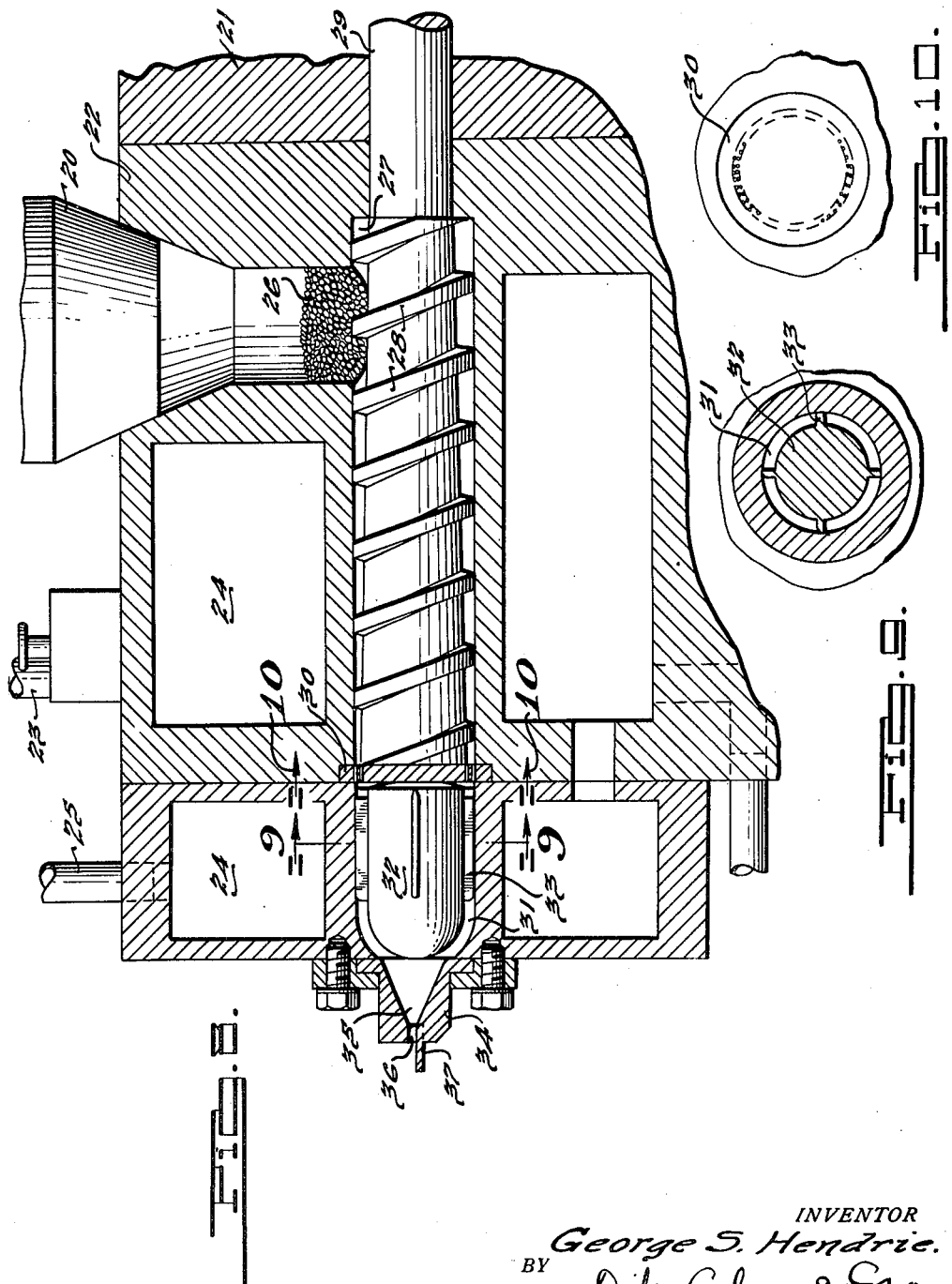

Sept. 1, 1942.    G. S. HENDRIE    2,294,555
METHOD AND APPARATUS FOR FORMING THERMOPLASTIC STRIPS
Filed Jan. 5, 1940    3 Sheets-Sheet 3
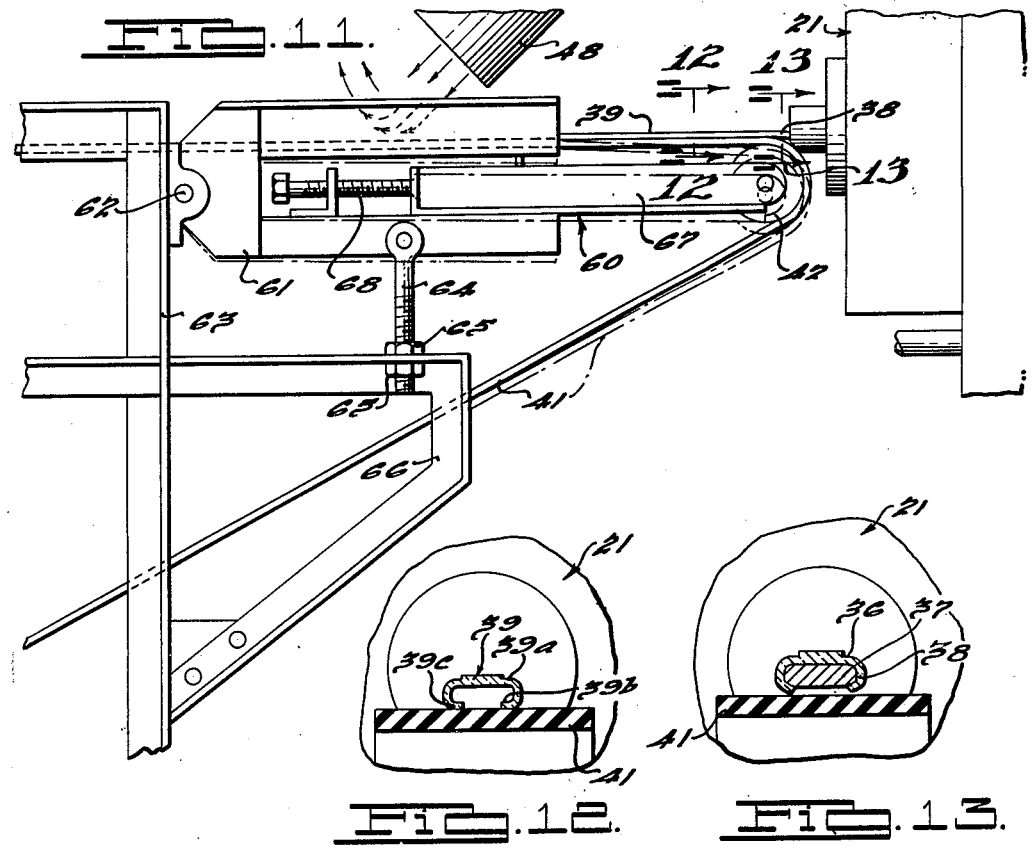
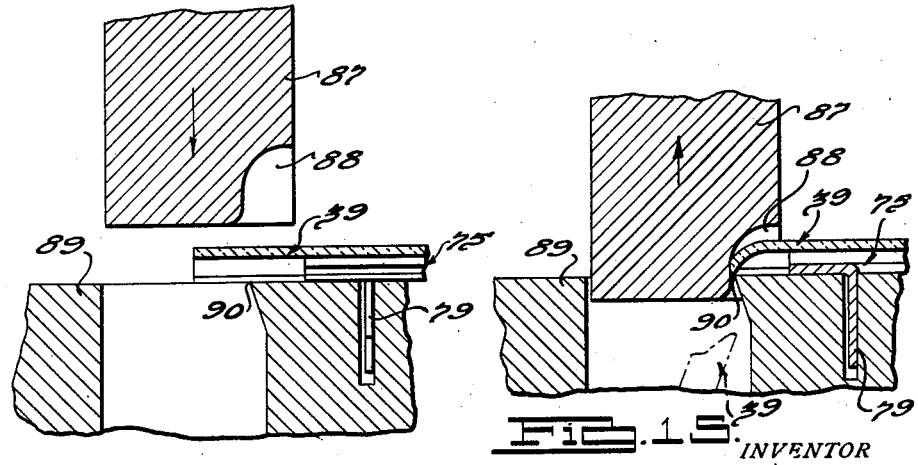
INVENTOR
George S. Hendrie.
BY Dike, Calver & Gray
ATTORNEYS Patented Sept. 1, 1942

2,294,555

UNITED STATES PATENT OFFICE 2,294,555

METHOD AND APPARATUS FOR FORMING THERMOPLASTIC STRIPS

George S. Hendrie, Grosse Pointe Farms, Mich., assignor to Detroit Macoid Corporation, Detroit, Mich., a corporation of Michigan Application January 5, 1940, Serial No. 312,562

8 Claims. (Cl. 18—12)

This invention relates to the manufacture of strips, such for example as trim moldings, formed from thermoplastic material, an object of the invention being to provide an improved method and apparatus for producing thermoplastic strips.

Another object of the invention is to provide a method and apparatus for manufacturing a hollow or channel-like strip, such as the ornamental shell of a trim molding, formed of an extruded plastic, and in which provision is made for maintaining uniformity of size and appearance of the extruded strip.

A further object of the invention is to provide an improved method and apparatus for forming a thermoplastic strip having a predetermined substantially uniform size and shape, in which a heated thermoplastic mass is forced through the forming orifice of an extruding die to form an initially extruded strip differing from the desired size and shape and in which a supporting medium is provided to receive the extruded strip, this supporting medium being adjustable with respect to the orifice of the extruding die so as to vary the extent of the unsupported portion of the strip thereby bringing the strip into the desired size and shape. In the preferred embodiment of the invention the extruded strip is received by an endless conveyor, the receiving end of which is adjustable with respect to the orifice of the extruding die, and provision is made for progressively cooling the strip on the conveyor.

The present invention is applicable to trim moldings of all kinds which, by way of example but not of limitation, include furniture, showcase and automobile body trim moldings, continuous edge or frame moldings, and ornamental moldings used in building construction. While the present invention will be herein disclosed in its preferred embodiment as an automobile body trim molding, it is to be understood that the present invention is not to be limited thereto.

Other objects and advantages of this invention will appear in the following description and appended claims, reference being had to the accompanying drawings forming a part of this specification wherein like reference characters designate corresponding parts in the several views. In the drawings:

Fig. 1 is a fragmentary side elevation showing the arrangement of the extrusion molding machine, conveyor and cooling system used in forming the extruded ornamental shell of the trim molding of the present invention;

Figs. 2 and 3 are side elevations, partly in section, showing successive operations in assembling the ornamental shell and a channel or nailing strip;

Fig. 4 is a fragmentary elevation of a cutting and forming machine showing the step of cutting and forming the ends of the ornamental shell of the assembled molding;

Figs. 5, 6 and 7 are fragmentary perspective views showing the trim molding during the several steps in its assembly shown in Figs. 2, 3 and 4, respectively;

Fig. 8 is an enlarged fragmentary section of a portion of the extrusion molding machine shown in Fig. 1;

Figs. 9 and 10 are sections taken substantially on the lines 9—9 and 10—10, respectively, of Fig. 8 in the direction of the arrows;

Fig. 11 is an enlarged fragmentary elevation of the end of the conveyor and a portion of the extrusion molding machine shown in Fig. 1;

Figs. 12 and 13 are sections taken substantially on the lines 12—12 and 13—13, respectively, of Fig. 11 in the direction of the arrows; and Figs. 14 and 15 are enlarged fragmentary sections of the cutting and forming die forming part of the machine shown in Fig. 4, illustrating the sequence of steps to cut and form the ends of the ornamental shell.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In carrying out the present invention, the ornamental shell of the composite trim molding is formed, as shown in Fig. 1, by the continuous extrusion process there shown. This process is particularly adapted for forming the ornamental shell as a continuous formed strip from a thermoplastic material, such for example as the cellulose acetate plastic material produced by The Eastman Company and sold under the commercial trade name "Tenite." It is to be understood, however, that various other kinds and types of thermoplastic materials may also be used in carrying out the present invention. The selected thermoplastic material, either plain or colored, is charged into the hopper 20 of the extrusion molding machine 21, which may be of any desired conventional design. One such machine, as shown in Fig. 1 and in greater detail in Figs. 8, 9 and 10, is provided with a jacketed head 22, through which circulates heated oil or other circulating heating medium. The circulating heated medium is supplied to the head 22 from a suitable heat supply (not shown) through the inlet supply pipe 23 and through the duct system 24 to the return pipe 25, through which it flows to the heating unit (not shown). The temperature of the circulating heating medium is regulated and controlled to provide a sufficient heating of the thermoplastic material to convert it from its solid granular form to its heat-softened moldable plastic condition. As will be seen by reference to Fig. 8, the solid granular thermoplastic material 26 flows from the hopper 20 to the heated chamber 27 and is moved progressively therethrough by a rotating feeding worm 28 which is power driven through the shaft 29. As the thermoplastic material is fed through the chamber 27, it absorbs heat which is conducted through the walls of the chamber 27 and the worm 28 and is also subjected to some additional heating due to the feeding action of the worm 28 and the friction caused by the resistance of the plastic material to the movement of the worm. The material is heated and is substantially in a state of plastic flow by the time it has traversed the chamber 27. A perforated baffle 30 is placed at the end of the chamber 27 and prevents any material which is not fully heat softened from passing out of the heating chamber 27 and entering the heated chamber 31. A torpedo 32 is placed in the chamber 31 and is provided with a plurality of radial fins 33 which extend outwardly of the body of the torpedo 32 and are maintained in heat transferring contact with the heated walls of the chamber 31. As shown in Fig. 9, this arrangement thus divides the plastic material into a plurality of streams of restricted area and relatively narrow cross section and thus assures a uniform heating of the mass as it flows through the heated chamber 31.

The feeding pressure of the screw 28 causes plastic material to flow continually through the perforated plate 30 and through the channels defined by the inner walls of the chamber 31, the peripheral surface of the torpedo 32 and the radial fins 33. A forming die 34 is removably secured to the casing of the head 22 and is provided with a hollow interior portion 35 which communicates with the discharge end of the heated chamber 31 and delivers the heated plastic materials to the forming orifice 36. The plastic material which is forced through the forming orifice 36 takes on an external contour and dimension corresponding to the internal contour and dimension of the orifice 36 and is internally shaped and supported by a mandrel 37 (see Fig. 13).

As a result of carrying out the above-described operations, there is formed a continuous plastic strip 38 which, as shown in Fig. 13, is generally similar in shape but of a wider and thicker cross section than the desired cross section of the finished strip 39 as shown in Fig. 12. The strip 38 immediately after it is extruded through the orifice 36 and is formed around the mandrel 37, takes an initial set sufficient to hold the general size and shape thus imparted thereto, but is still sufficiently heated that it remains somewhat plastic and may be subjected to the further forming operation (to be hereinafter more fully described) which is required to impart the finished shape and size thereto.

The formed plastic strip 38 is subjected to a further forming operation and is continuously cooled and carried away from the discharge end of the forming die 34 by an endless belt conveyor, indicated generally by the numeral 40. The conveyor 40 consists of an endless belt 41, preferably formed of rubber and fabric, which is threaded over an adjustable end belt roller 42 and driving end belt roller 43 which is drivingly connected by the drive chain 44 with a speed reducer 45 which in turn is drivingly connected with an electric motor 46 or other suitable power source. The belt 41 travels from the adjustable end roller 42 to the driving roller 43 over a conveyor table 47, which may, if desired, be provided with a plurality of belt-supporting anti-friction members (not shown). During the travel of the belt 41 over the table 47, the belt and the molded strip carried thereon are continuously cooled by air currents discharged thereon through a plurality of air ducts 48. The return path of the belt 41 is beneath the table 47 and is defined by a plurality of return rollers 50 and the take-up roller 51 which is provided with any desired type of adjustable belt take-up mechanism 52. After passing the take-up roller 51 and before contacting the adjustable end roller 42, the belt 41 is lubricated by fluid lubricant flowing through the pipe 53. In the event that the belt 41 is formed of rubber and fabric, water is a preferred lubricating fluid as it also assists in cooling the belt and by its evaporation accelerates the rate of cooling of the plastic strip carried on the belt 41. It is to be understood, however, that other suitable types of lubricant also may be used, the type chosen depending on the type of belt used and other factors.

The shape and size of the finished molded strip 39 are controlled by controlling the speed of travel of the belt 41 and by regulating the position of the belt 41 and end roller 42 relative to the discharge orifice 36 and the mandrel 37. The speed of travel of the belt 41 is regulated by the speed of the motor 46 and by the belts and pulleys connecting it with the gear box 45, as well as by the gearing in the box and the driving and driven sprockets connected with the drive chain 44.

The position of the belt 41 and the end roller 42 relative to the discharge orifice 36 is regulated and controlled by the adjustable roller carrying frame 60, as clearly shown in Fig. 11. The frame 60 comprises a bracket member 61 which is pivotally connected as at 62 with an end upright 63 of the frame which supports the table 47 and is adjustably supported adjacent its end by the threaded eyebolt 64 and adjusting nuts 65 which engage the extending bracket 66. By adjusting the nuts 65, the end of the member 61 will be caused to pivot about the pivot point 62 and raised and lowered relative to the horizontal plane of the discharge orifice 36. The roller 42 is carried on a shaft journaled in a slide 67, which is carried by the bracket member 61. The slide 67 is moved longitudinally of the member 61 by the screw-threaded adjustment mechanism 68. Thus by adjusting the position of the slide 67 relative to the bracket member 61, and by adjusting the angular position of the member 61, the roller 42 and the belt 41 may be adjusted in different positions relative to the discharge orifice 36. This position of the roller 42 and the belt 41 relative to the discharge orifice 36 is a critical factor which determines the variation in the initial size and shape of the extruded plastic strip as it is drawn from the mandrel 37. If the roller 42 and the belt 41 are adjusted to contact the extruded strip in a horizontal plane below the discharge orifice 36, the strip will take on a wider and thicker shape than if the roller 42 and the belt 41 are so adjusted that the belt initially contacts the extruded strip in a plane above the horizontal plane of the discharge orifice 36. By regulating the speed of travel of the belt 41, the plastic strip can be carried away from the discharge orifice 36 at a slightly greater speed than the rate of flow of the plastic material through the orifice and this will elongate the strip during its initial setting period and reduce its width and cross section. The additional working of the extruded strip by elongating it as just described, has been found to exert a desirable control in eliminating substantial variations in width and cross-sectional thickness of the extruded strip. This is due to the fact that by the adjustment of the end roller 42 and the belt 41 it is possible to provide a portion of extruded strip of any desired shape and dimension in an initially set but still deformable condition. This initially set but still deformable portion is then drawn to the desired size and shape by a process of elongation, during which time it takes its final set. Such an arrangement avoids the variations in dimension of such extruded strips which are frequently encountered where attempts are made to form the final size and shape of strip in the hot plastic material in the forming die 34.

As the continuous strip 39 is discharged from the belt 41 in a cooled and set condition, it is cut to predetermined lengths by the cut-off mechanism 70 which may be either manually or automatically actuated.

As a result of the foregoing operations, there will be formed a plurality of pieces of molded strips which, in the present instance, are generally C-shaped in cross section and have an internal longitudinal channel therein which is surrounded by the shaped body 39a of the strip and by longitudinal flanges 39b (see Fig. 12).

If it is desired to use the strip as an edge or frame trim molding, a suitable attaching strip or lugs may be secured to the material to be trimmed and the plastic strips 39 threaded thereon.

Where it is desired to provide a finished trim molding in the form of trim strips of predetermined lengths, the ornamental plastic strip 39 may be secured to a supporting channel or tacking strip as shown in Figs. 2 to 7, inclusive, and in Figs. 14 and 15. As shown in these figures, a tacking strip 75 of conventional construction is utilized as the supporting channel and trim securing member. As shown in Fig. 5, such a strip comprises a longitudinally extending channel 76 having upwardly and outwardly extending flanges 77 and 78. Depending sharpened lugs 79 are punched from the material forming the channel 76 and provide a ready means for securing the channel 76 and the plastic strip 39 to an object to be trimmed.

The formed strip 39 may be secured to the channel 76 as shown in Fig. 2. As there shown, an assembly jig or fixture 80 is provided with a top portion 81 in which is provided a plurality of spaced holes 82 which conform in size, shape and spacing to the size, shape and spacing of the lugs 79 on the tacking strip 75. The tacking strip 75 is placed on the jig or fixture 80 and the lugs 79 are inserted in the corresponding spaced holes 82. The plastic strip 39 is then slid over the flanges 77 and 78 and the flanges 39b of the strip 39 are brought in contact therewith as shown in greater detail in Fig. 5. The relative lengths of the strip 39 and the strip 75 are so selected that the ends of the strip 39 extend beyond the ends of the strip 75, as shown in Fig. 6.

In order to provide a finished appearance on the ends of the strips, the extending ends of the strip 39 are cut and formed to provide an end which extends over the end of the tacking strip 75 and which has the ornamental and finished appearance shown in Fig. 7.

The end finishing operation is shown in Figs. 3, 4, 14 and 15 and reference is now made to these views. As shown in Fig. 3, the assembled strip is removed from the jig or fixture 80 and the end thereof is suitably heated, as for example in an electric heating oven or furnace 85, wherein the extending end of the plastic strip 39 is heat softened. After the end of the strip 39 is softened by the heat, it is placed in a punch press 86, as shown in Fig. 4, where the excess plastic material is sheared and the end formed as shown in Figs. 14 and 15. As there shown, the male punch 87 is provided with an end forming recess 88. As the male punch 87 moves downwardly into the female cutting die 89, the excess material of the extending end of the strip 39 is sheared off by the sharp cutting edge 90 provided on the die 89. Since the end of the strip 39 is in a heat-softened condition, the recess 88 in the male punch 87 shapes and forms the end of the strip 39 to the desired shape and design.

If desired, other means of softening or plasticizing the ends of the plastic shell may be employed, as for example softening by the use of a volatile liquid plasticizing agent. After completion of the cutting and forming operation, the ends of the shell are allowed to harden and it will be seen that the ends of the tacking strip are entirely concealed and endwise movement of the shell relative to the strip is prevented, thus positively locking together the shell and strip.

From the foregoing it will be seen that the present invention provides an ornamental trim molding and method of forming the same which is of uniform and ornamental design and appearance and which is readily and economically manufactured in mass production.

I claim:

1. In an apparatus for forming a thermoplastic strip, the combination of an extruding die having a forming orifice and a fixed mandrel, means for forcing a heated thermoplastic mass through said orifice and over said mandrel in a continuous hollow or channel-like strip, an endless conveyor comprising an endless belt member and means for supporting and driving said endless belt member, means for controlling the final shape of the extruded thermoplastic strip and comprising an adjustable pivotally mounted end section forming a part of said endless conveyor, adjusting means for moving said end section vertically relative to said extruding die, a longitudinally extensible and retractible member forming a part of said end section, adjusting means adapted to vary the longitudinal spacing between said conveyor and said extruding die, an idler pulley engaging the endless belt, and means to move the idler pulley to compensate vertical and longitudinal movement of said end section of the conveyor relative to the extruding die and to vary the tension of the endless belt.

2. In an apparatus for forming a thermoplastic strip, the combination of an extruding die having a forming orifice and a fixed mandrel, means for forcing a heated thermoplastic mass through said orifice and over said mandrel in a continuous hollow or channel-like strip, an endless conveyor having one end supported adjacent said orifice for vertical and longitudinal movement relative thereto and adapted to receive said strip, means for driving said conveyor, means for adjusting said conveyor end vertically and longitudinally relative to said orifice to control the extent and direction of the unsupported movement of the extruded thermoplastic strip when initially discharged from said forming orifice, means to compensate variations of the length of said endless conveyor upon movement of the conveyor end vertically and longitudinally relative to said orifice, and a cooling system adapted to accelerate the removal of heat from the extruded thermoplastic strip during its travel on the said endless conveyor and comprising spaced duct members communicating with a supply of air under positive pressure and terminating adjacent the extruded thermoplastic strip on said conveyor whereby heat is removed continuously from the extruded thermoplastic strip and said conveyor.

3. In an apparatus for forming a thermoplastic strip, the combination of an extruding die having a forming orifice and a fixed mandrel, means for forcing a heated thermoplastic mass through said orifice and over said mandrel in a continuous hollow or channel-like strip, an endless conveyor having one end supported adjacent said orifice to receive said strip, means for driving said conveyor at a linear speed in excess of the linear speed of discharge from said orifice, means for adjusting the conveyor end toward or from said orifice to vary the extent of unsupported movement of the extruded strip between said extruding die and said endless conveyor, means to compensate variations of the length of said endless conveyor upon movement of the conveyor end toward or from the orifice to vary the extent of unsupported movement of the extruded strip, and a cooling system adapted to accelerate the removal of heat from the extruded thermoplastic strip during its travel on the said endless conveyor and comprising spaced duct members communicating with a supply of air under positive pressure and terminating adjacent the extruded thermoplastic strip on said conveyor whereby heat is removed continuously from the extruded thermoplastic strip and said conveyor.

4. In an apparatus for forming a thermoplastic strip, the combination of an extruding die having a forming orifice and a fixed mandrel, means for forcing a heated thermoplastic mass through said orifice and over said mandrel in a continuous hollow or channel-like strip, an endless conveyor comprising an endless belt member and means for supporting and driving said endless belt member, means for controlling the final shape of the extruded thermoplastic strip and comprising an adjustable pivotally mounted end section forming a part of said endless conveyor, adjusting means for moving said end section vertically relative to said extruding die, a longitudinally extensible and retractible member forming a part of said end section, adjusting means adapted to vary the longitudinal spacing between said conveyor and said extruding die, means to compensate variations of the length of said endless conveyor upon movement of the conveyor end vertically and longitudinally relative to said orifice, and a cooling system adapted to accelerate the removal of heat from the extruded thermoplastic strip during its travel on the said endless conveyor and comprising spaced duct members communicating with a supply of air under positive pressure and terminating adjacent the extruded thermoplastic strip on said conveyor whereby heat is removed continuously from the extruded thermoplastic strip and said conveyor.

5. In an apparatus for forming a thermoplastic strip, the combination of an extruding die having a forming orifice and a fixed mandrel, means for forcing a heated thermoplastic mass through said orifice and over said mandrel in a continuous hollow or channel-like strip, an endless conveyor having one end supported adjacent said orifice for vertical and longitudinal movement relative thereto and adapted to receive said strip, means for driving said conveyor, means for adjusting said conveyor end vertically and longitudinally relative to said orifice to control the extent and direction of the unsupported movement of the extruded thermoplastic strip when initially discharged from said forming orifice, an idler pulley engaging the endless conveyor, and means to move the idler pulley to compensate vertical and longitudinal movement of the conveyor relative to said orifice.

6. In an apparatus for forming a thermoplastic strip, the combination of an extruding die having a forming orifice and a fixed mandrel, means for forcing a heated thermoplastic mass through said orifice and over said mandrel in a continuous hollow or channel-like strip, an endless conveyor having one end supported adjacent said orifice to receive said strip, means for driving said conveyor at a linear speed in excess of the linear speed of discharge from said orifice, means for adjusting the conveyor end toward or from said orifice to vary the extent of unsupported movement of the extruded strip between said extruding die and said endless conveyor, and means to compensate variations of the length of said endless conveyor upon movement of the conveyor end toward or from the orifice to vary the extent of unsupported movement of the extruded strip.

7. The method of forming a thermoplastic strip having a predetermined substantially uniform size and shape which comprises the steps of forcing a heated thermoplastic mass through a forming orifice to form an initially extruded strip differing from the desired size and shape, receiving said strip on a support spaced from the orifice and adjusting the spacing of the support from the orifice to vary the extent of the unsupported portion of the strip to bring said strip to the desired size and shape, and cooling said strip on the support.

8. The method of forming a thermoplastic molding strip having a predetermined substantially uniform size and shape which comprises the steps of forcing a heated thermoplastic mass through a forming orifice to form an initially extruded strip differing from the desired size and shape, receiving said strip on a support spaced from the orifice, and adjusting the spacing of the support from the orifice to vary the extent or direction of the unsupported portion of the strip to bring said strip to the desired size and shape, and progressively cooling said strip on the support.

GEORGE S. HENDRIE.